(12) United States Patent
Garcia et al.

(10) Patent No.: US 12,069,121 B1
(45) Date of Patent: Aug. 20, 2024

(54) ADAPTIVE VIDEO QUALITY FOR LARGE-SCALE VIDEO CONFERENCING

(71) Applicant: RingCentral, Inc., Belmont, CA (US)

(72) Inventors: Gustavo Garcia, Madrid (ES); Badri Rajasekar, Walnut Creek, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 17/557,872

(22) Filed: Dec. 21, 2021

(51) Int. Cl.
| | | |
|---|---|---|
| *H04N 7/15* | (2006.01) | |
| *G06T 3/4053* | (2024.01) | |
| *H04L 65/75* | (2022.01) | |
| *H04N 5/265* | (2006.01) | |
| *H04N 7/01* | (2006.01) | |

(52) U.S. Cl.
CPC ............ *H04L 65/75* (2022.05); *G06T 3/4053* (2013.01); *H04N 5/265* (2013.01); *H04N 7/0127* (2013.01)

(58) Field of Classification Search
CPC ..... H04L 65/601; G06T 3/4053; H04N 5/265; H04N 7/0127; H04N 19/169; H04N 19/136
See application file for complete search history.

(56) References Cited

U.S. PATENT DOCUMENTS

| | | | | |
|---|---|---|---|---|
| 10,382,722 | B1 * | 8/2019 | Peters ..................... | H04N 7/152 |
| 2002/0113862 | A1 * | 8/2002 | Center, Jr. ............ | H04N 19/186 |
| | | | | 348/E7.083 |
| 2006/0215014 | A1 * | 9/2006 | Cohen .................. | H04N 19/172 |
| | | | | 375/E7.181 |
| 2008/0218582 | A1 * | 9/2008 | Buckler .................... | H04N 7/15 |
| | | | | 348/E7.083 |
| 2009/0098914 | A1 * | 4/2009 | Martin-Cocher .......................... | |
| | | | | H04W 52/0264 |
| | | | | 307/130 |
| 2013/0147906 | A1 * | 6/2013 | Weiser .................... | H04N 7/155 |
| | | | | 348/14.09 |
| 2014/0341280 | A1 * | 11/2014 | Yang ........................ | H04N 7/15 |
| | | | | 375/240.08 |
| 2015/0326824 | A1 * | 11/2015 | Midtskogen Berger ..................... | |
| | | | | H04L 65/1069 |
| | | | | 348/14.09 |
| 2016/0192296 | A1 * | 6/2016 | Rehan ............... | H04W 52/0229 |
| | | | | 455/574 |
| 2016/0269645 | A1 * | 9/2016 | Khoe .................... | H04N 23/611 |
| 2017/0034223 | A1 * | 2/2017 | Arscott ............... | H04L 65/1083 |
| 2017/0041570 | A1 * | 2/2017 | Takahashi .......... | H04N 5/23238 |

(Continued)

FOREIGN PATENT DOCUMENTS

CN        21011215 U    *   2/2020

*Primary Examiner* — James T Boylan
(74) *Attorney, Agent, or Firm* — Ansari Katiraei LLP; Arman Katiraei; Sadiq Ansari (57) ABSTRACT

Media, methods, and systems are disclosed for adaptively adjusting video quality in a virtual event hosted by a virtual event hosting platform. A plurality of presenter video streams may be received at a video server. A change of state associated with a presenter video stream of the plurality of presenter video streams may be detected. In response to detecting the change of state, a change to a video display parameter for the presenter video stream may be requested by the video server. The video server may receive the updated presenter video stream from a presenter computing device associated with the presenter video stream. The video server may send updated presenter video stream to a plurality of presenter computing devices associated with the plurality of presenter video streams.

18 Claims, 4 Drawing Sheets

(56) References Cited

U.S. PATENT DOCUMENTS

| | | | |
|---|---|---|---|
| 2017/0272649 A1* | 9/2017 | Liu | H04N 5/247 |
| 2018/0278928 A1* | 9/2018 | De La Paz | H04N 17/004 |
| 2019/0088153 A1* | 3/2019 | Bader-Natal | H04N 7/147 |
| 2019/0179726 A1* | 6/2019 | Hou | G06F 11/3495 |
| 2019/0213420 A1* | 7/2019 | Karyodisa | G06V 20/41 |
| 2021/0168408 A1* | 6/2021 | Malakhov | H04N 19/167 |
| 2021/0218845 A1* | 7/2021 | Magi | G06V 40/18 |
| 2021/0250547 A1* | 8/2021 | Jiang | H04L 65/70 |
| 2022/0020386 A1* | 1/2022 | Vanapalli | G10L 21/0208 |
| 2022/0060692 A1* | 2/2022 | Zhang | H04N 19/176 |
| 2023/0143579 A1* | 5/2023 | Asgekar | H04L 12/1822 348/14.09 |

* cited by examiner

FIG. 4 ically adapting the quality of a video. More specifically, embodiments of the invention relate to adapting the video quality in a virtual event hosting platform in response to dynamically changing video states, user interface states, and computing systems states by changing video display parameters to optimize video quality and platform performance.

ADAPTIVE VIDEO QUALITY FOR LARGE-SCALE VIDEO CONFERENCING

TECHNICAL FIELD

Embodiments of the invention generally relate to dynamically adapting the quality of a video. More specifically, embodiments of the invention relate to adapting the video quality in a virtual event hosting platform in response to dynamically changing video states, user interface states, and computing systems states by changing video display parameters to optimize video quality and platform performance.

In traditional video conference and virtual event hosting platforms, it may be difficult to stream video to a large number of viewers (e.g., greater than 10,000 or greater than 100,000) while effectively managing the bandwidth and ensuring efficient transmission of data. Bandwidth management becomes increasingly difficult as the number of input video streams that are added into the output video stream displayed to the viewers is increased and as the number of viewers watching the combined video stream increases.

As such, what is needed is an adaptive virtual event hosting platform that can dynamically adjust the video quality to provide the optimal video stream to every viewer based on the context of the video. Adjustments to the video streaming process can be made both client-side and server-side.

SUMMARY

Embodiments of the invention address the above-identified need by providing systems and methods for adaptive video quality. A plurality of presenter video streams may be received at a server and routed to virtual event attendees as individual streams or as part of a combined video stream for a virtual event. Video frames for the presenter video streams may be adjusted to present the most relevant video streams at a high fidelity. Video display parameters such as bitrate, resolution, and frame rate may be adjusted dynamically to improve the video output. As changes of state associated with the video streams are detected, the video streams may be adjusted. By adjusting the video quality dynamically, attendees may be provided an optimal virtual event experience.

A first embodiment is directed to one or more non-transitory computer-readable media storing computer-executable instructions that, when executed by a processor, perform a method of adaptively adjusting video quality in virtual event hosted by a virtual event hosting platform, the method comprising receiving, at a video server, a plurality of presenter video streams associated with a plurality of presenter computing devices, the plurality of presenter video streams forming the virtual event, detecting a change of state associated a presenter video stream of the plurality of presenter video streams, in response to detecting the change of state, requesting, by the video server, a change to a video display parameter for the presenter video stream, receiving, at the video server, an updated presenter video stream form a presenter computing device associated with the presenter video stream, and selectively forwarding, from the video server, at least a portion of the updated presenter video stream to each presenter computing device associated with each of the plurality of presenter video streams in the virtual event.

A second embodiment is directed to a method for adaptively adjusting video quality in a virtual event hosted by a virtual event hosting platform, the method comprising receiving, at a video server, a plurality of presenter video streams associated with a plurality of presenter computing devices, the plurality of presenter video streams forming the virtual event, detecting a change of state associated a presenter video stream of the plurality of presenter video streams, in response to detecting the change of state, requesting, by the video server, a change to a video display parameter for the presenter video stream, and receiving, at the video server, an updated presenter video stream from a presenter computing device associated with the presenter video stream, and forwarding, from the video server, the updated presenter video stream to each presenter computing device associated with each of the plurality of presenter video streams in the virtual event. The video display quality parameter is adjusted at the presenter computing device.

A third embodiment is directed to a system for adaptively adjusting video quality in a virtual event hosted by a virtual event hosting platform, the system comprising a video server, a processor, and one or more non-transitory computer-readable media storing computer-executable instructions that, when executed by a processor, perform a method of adaptively adjusting video quality in the virtual event hosted by the virtual event hosting platform, the method comprising receiving, at the video server, a plurality of presenter video streams associated with a plurality of presenter computing devices, the plurality of presenter video streams forming the virtual event, forwarding the plurality of presenter video streams to each of the plurality of presenter computing devices according to a predefined video stream layout, detecting a change of state associated with a presenter video stream of the plurality of presenter video streams, in response to detecting the change of state, requesting, by the video server, a change to a video display parameter for the presenter video stream, receiving, at the video server, an updated presenter video stream from a presenter computing device associated with the presenter video stream, and forwarding from the presenter video stream to each presenter computing device according to the predefined stream layout.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Disclosed embodiments are generally directed to methods of dynamically adapting the quality of a video stream for a virtual event hosting platform to maximize video quality and computing efficiency. Dynamically changing video states may comprise changes of state of the video stream itself, changes of state associated with the user interface for the video stream, changes of state related to a system (e.g., computing device) associated with the video stream, or any combination thereof as will be discussed in further detail below. Presenters for a virtual event hosted by the virtual event hosting platform may stream audio and video from their computing device, which is then forwarded, via a video server, to all attendees of the virtual event. The presenter video streams may be dynamically adapted to improve the quality of the virtual event. In some embodiments, the presenter video streams are dynamically adjusted client-side before being sent to a video server and forwarded from the video server to the attendees. In some embodiments, the presenter video streams are sent from the video client to the video server and adjusted at the video server before being forwarded to the other presenters.

Various video display parameters, such as framerate, bitrate, and resolution, may be changed in real time to increase the overall viewing and streaming quality. Regions of interest in a video stream may be determined, and the video quality may be scaled to increase the video quality for those regions of interest. For example, a presenter's face may represent a region of interest and may be encoded at a higher quality than other regions of the video frame, such as the background. Codecs may be selected dynamically to present the optimal video feed. Video may be transmitted from the video server at various quality levels such that attendees with varying connection speeds can watch the video stream without substantial lag and/or buffering of the video stream. Dynamic parameters such as computing-device battery level or the number of attendees may result in video quality adjustments. For example, when a presenter's battery life reaches a low battery threshold, the video resolution streamed by the presenter may be downgraded client-side from 1080p to 720p. The virtual event hosting platform may host hundreds, thousands, or hundreds of thousands of attendees at once. As used herein, a virtual event attendee (referred to as an attendee hereinafter) may view and interact (such as via chat or polls) with the virtual event hosting platform but does not have permission to speak or share content during the virtual event. As used herein, presenters are attendees of the virtual event who have permission to speak and/or share content during the virtual event. The status of attendees may vary throughout the virtual event such that attendees may be promoted to presenters and vice versa.

Figure 1:
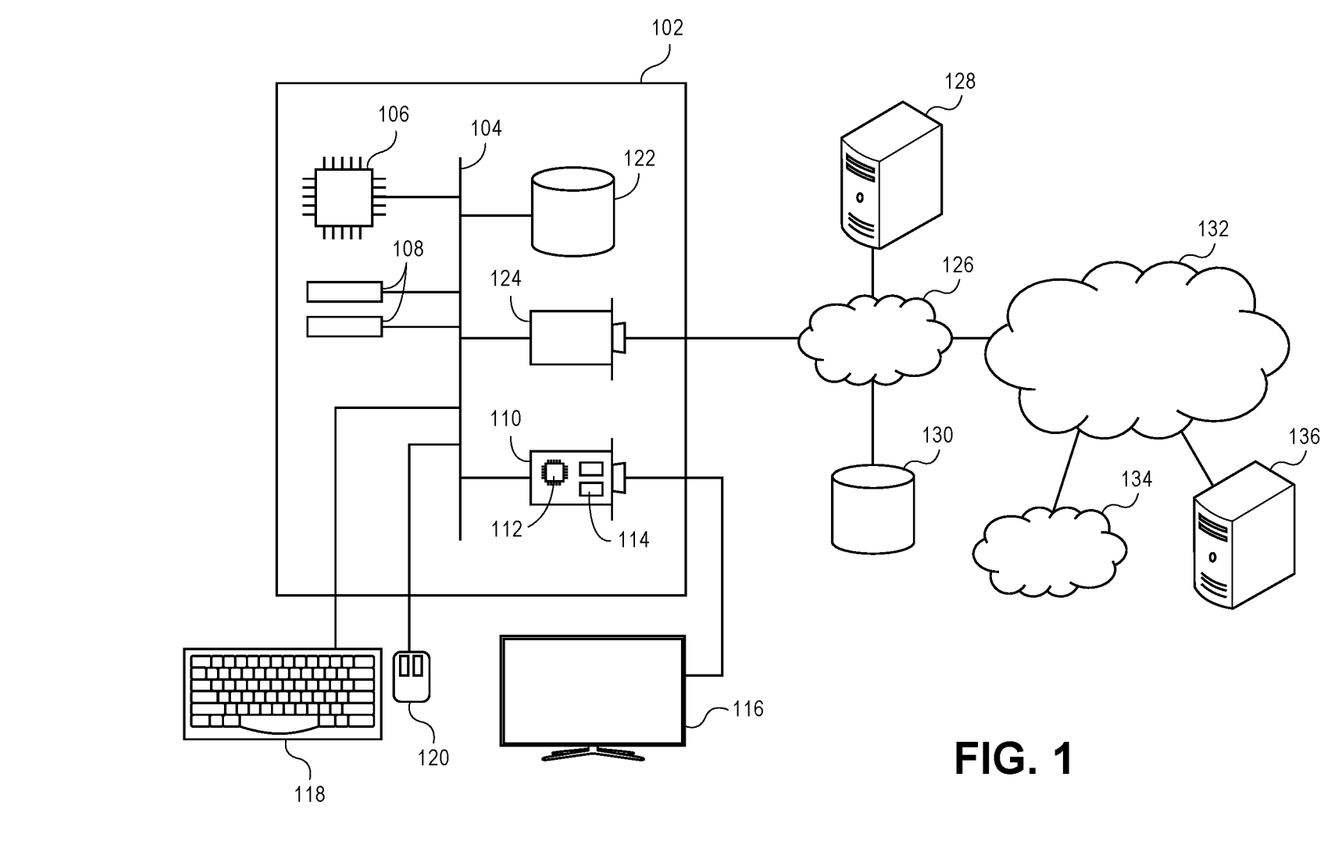
FIG. 1 depicts an exemplary hardware platform for certain embodiments of the invention.

Turning first to FIG. 1, an exemplary hardware platform for certain embodiments is depicted. Computer 102 can be a desktop computer, a laptop computer, a server computer, a mobile device such as a smartphone or tablet, or any other form factor of general- or special-purpose computing device containing at least one processor. Depicted with computer 102 are several components, for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, such as non-transitory computer readable media, and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

Figure 2:
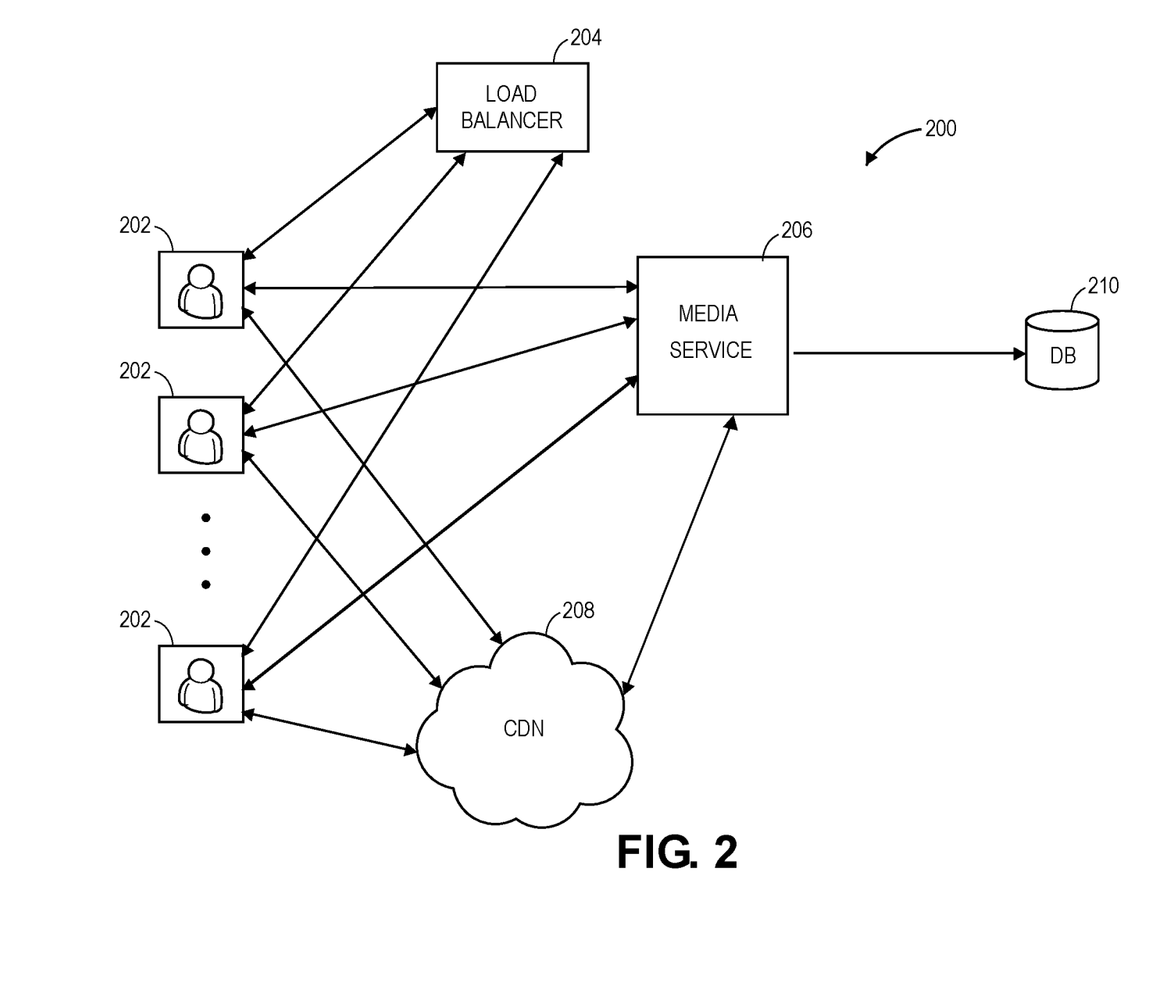
FIG. 2 depicts elements of a system for carrying out certain embodiments of the invention.

FIG. 2 illustrates elements of a system 200 for carrying out embodiments of the invention. System 200 provides a platform for interacting with one or more virtual event hosting systems. System 200 includes any number of client devices such as virtual event hosting system client devices 202 (or client devices, used interchangeably hereinafter). An individual user may connect to components of system 200 using a single client device or multiple client devices, either concurrently or sequentially. Similarly, in some embodiments, multiple users may share (concurrently or sequentially) a single client device to access the virtual event hosting system. As depicted in FIG. 2, client devices may be any form of computing device discussed above with respect to FIG. 1. A user may access components of system 200 using a desktop computer, a laptop computer, or a mobile device. Components of system 200 may be accessible via dedicated software of a particular client device or via a web browser associated with the client device. In some embodiments, event organizers and virtual event hosting system administrators can access administrative functionality via any client device. In other embodiments, administrative functions can only be accessed from a limited subset of client devices.

In some embodiments, a virtual event hosting system provides functionality in connection with media services 206. Media services 206 may be a dedicated server, a shared server, a virtual machine instance in a cloud computing environment, or any other form of computing device discussed above with respect to FIG. 1. Media services 206 may also be implemented in connection with containers (e.g., Docker-style containers) as provided by platform-as-a-service (PaaS) technologies with virtualized host operating systems or with any number of serverless PaaS technologies.

Although a single media services 206 is depicted, embodiments with multiple such services are also contemplated to provide scale, redundancy and/or isolation between different instances of the virtual event hosting system. For example, an event organizer hosting a private virtual event in which event attendees register for the event under a non-disclosure agreement may not wish to have its confidential virtual event hosted on the same system as another event organizer's virtual event hosting system for security reasons.

Moreover, a virtual event with thousands of attendees may require multiple instances of media services 206 for scaling purposes to provide sufficiently performant interactive response times that are adequate to provide an acceptable user experience. Yet further, a virtual event hosting system should be able to withstand an internal network partition or failure of computing resources. By providing multiple instances of media services 206, optionally in various geographies and/or telecommunications infrastructures, hardware failure may result in a brief interruption (as a new media services 206 takes over) rather than a complete outage, from a user's perspective.

Load balancer 204 represents a service for effectively distributing incoming requests to a group of back-end resources so that no individual system resource (or group of resources) becomes overloaded by sheer quantity of incoming requests. As depicted, load balancer 204 receives incoming requests from virtual event hosting system client devices 202. Once the client devices request access to certain network resources, load balancer 204 distributes corresponding requests to media services 206. Load balancer 204 may employ any number of load-balancing strategies, including round-robin, weighted round-robin, least connection, weighted least connection, resource based, fixed weighting, weighted response time, or any combination thereof. Like media services 206, load balancer 204 may be implemented as a physical hardware device or in connection with software as a service (Saas), infrastructure as a service (IaaS) or PaaS, including serverless execution in a serverless execution environment. In some embodiments, machine learning computations may be performed in connection with load balancer 204 including training of an associated load-balancing machine learning model. In some embodiments, the associated machine learning model may learn to apply a load-balancing strategy that, depending on a type of request, results in an optimal distribution of network and processing load across media services 206.

In some embodiments, media assets associated with a particular virtual event may be stored in one or more static content delivery networks (CDN) 208 in the cloud. CDNs are geographically distributed networks of caching proxy servers in geographically distributed data centers. CDNs provide highly available and performant caching of media content by distributing corresponding media files and providing the media files geographically closer to requesting client devices. By using CDN 208, overall network bandwidth is conserved, performance is improved at client devices, and load is reduced at media services 206 and database 210. Users of the virtual event hosting system are provided with geographically proximate, cached access to virtual event media assets, thereby improving the user experience and reducing load on the virtual event hosting system.

Media services 206 may be communicatively coupled to virtual event hosting system client devices 202 as well as load balancer 204 and CDN 208 via a network. Such a network may be a local area network (LAN), wide-area network (WAN), virtual private network (VPN) or the Internet. Broadly speaking, any type of network for providing communication between the various components of system 200 is contemplated. Media services 206 may provide web server functionality to enable web-based clients and non-web server functionality to enable clients using a dedicated client-side application. Alternatively, both web-based clients and dedicated client-side application clients may both use a single web server, or the web server may be a gateway providing web-based access to a dedicated client-side application service. Other techniques for enabling communication among various types of client applications are also contemplated.

Database 210 is communicatively connected to media services 206. As depicted, database 210 is directly connected to media services 206; however, any form of communicative connection (for example, network-attached storage (NAS), a network file system (NFS), or cloud-based storage) can be employed. Broadly speaking, database 210 stores structured data regarding a particular virtual event, used by media services 206. For example, database 210 may store virtual event user participation information, such as lists of participating users and information regarding user participation. User participation includes voting on a poll or typing a message in a chat session. In a large event, database 210 may contain up-to-date information regarding participation of many thousands of users.

As previously discussed, multiple virtual event hosting systems may be present in system 200. In such embodiments, each virtual event hosting system may have its own database 210. Alternatively, multiple virtual event hosting systems may share a single network-attached database. Alternatively, or in addition, in any of these embodiments, data may be sharded across multiple databases.

In some embodiments, media services 206 receives a plurality of presenter video streams from the various presenters for the virtual event. The plurality of presenter video streams may comprise varying frame rates, bitrates, resolution, or a combination thereof. Media services 206 may then route and forward the video streams as packets to the other presenters or the attendees as part of the virtual event. In some embodiments, media services 206 selectively filters frames from a presenter video stream and sends the presenter video stream out at different frame rates to different attendees. In some embodiments, media services 206 filters resolutions for a presenter video stream and selectively forwards the presenter video streams at different resolutions for attendees. For example, an attendee with a poor Internet connection may receive a lower frame rate and lower resolution video. Media services 206 may adjust presenter video streams if needed, such as by applying a video super-resolution algorithm to boost the resolution of a presenter video stream that was received from a presenter with a poor Internet connection. In some embodiments, media services 206 receives the plurality of presenter video streams and mixes the presenter video streams together before routing the mixed presenter video streams as a combined video stream to attendees of the virtual event. Mixing of the video streams may be done for archival purposes or for streaming the virtual event to a platform separate from the virtual event hosting platform. In some such embodiments, lossless videos of each of the presenter video streams may be saved. In some embodiments, presenter video streams are recorded at media services 206 and stored in database 210. In some embodiments, client devices 202 may record the presenter video stream in a lossless format along with the live-streamed presenter video stream and transmit the lossless video to media services 206 for storage in database 210. In some embodiments, the transmittal of the lossless video is delayed if the presenter has a substantially poor connection, such that the quality of the live-streamed presenter video stream is not affected. In some embodiments, the presenter video streams are sent between the plurality of participants and media services 206 using a form of low latency communication such as WebRTC (Web Real-Time Communication).

Figure 3:
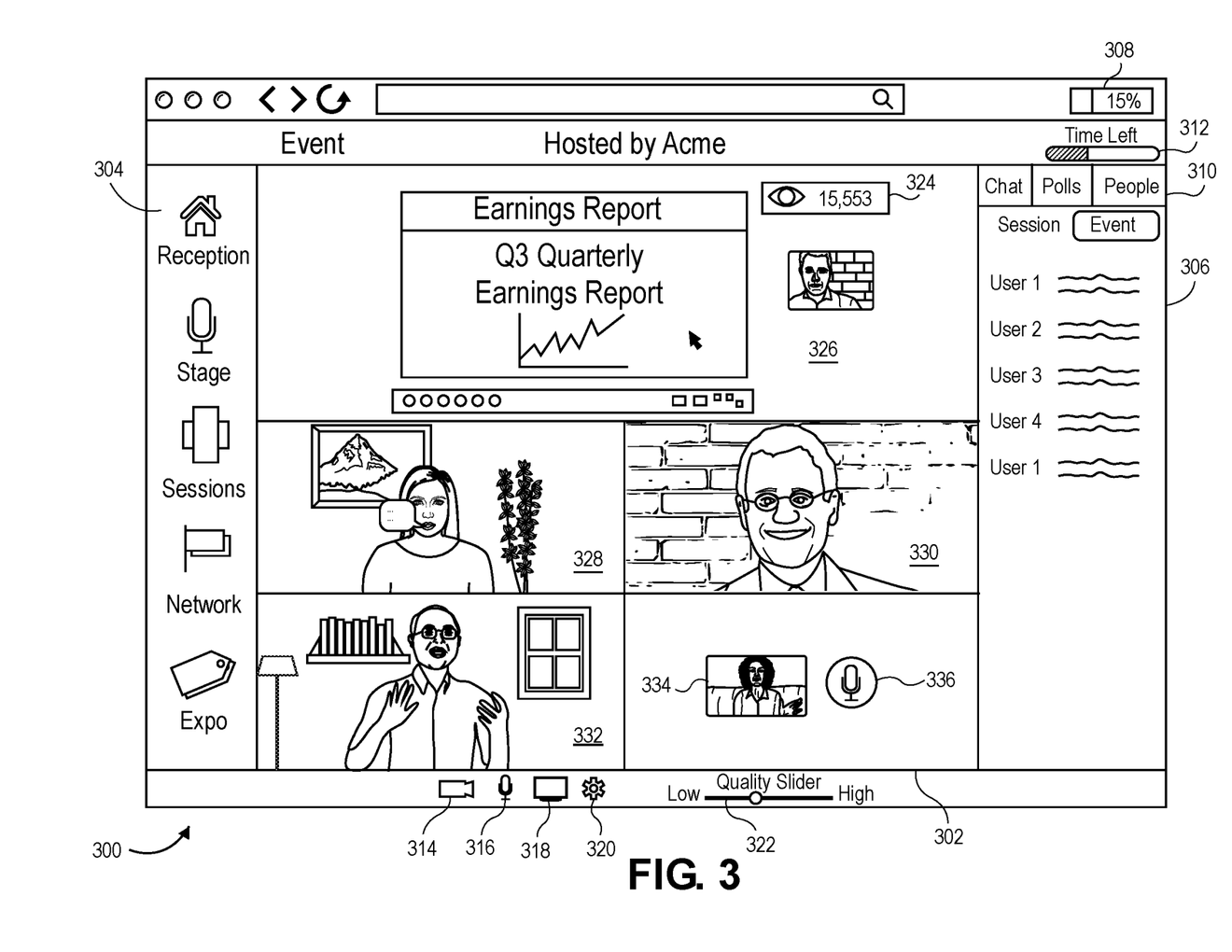
FIG. 3 illustrates a user interface for a virtual event hosting platform for certain embodiments.

FIG. 3 illustrates a user interface 300 for certain embodiments. User interface 300 may be a client user interface associated with system 200 and may display various information related to the virtual event hosting platform. User interface 300 may comprise video pane 302, navigation pane 304, and chat pane 306 as shown. User interface 300 may also display systems header 308 illustrating various systems-level information retrieved from client device 202, such as a battery level. in some embodiments, systems header 308 may also illustrate CPU usage, package loss, upload and/or download speeds, ping, or any combination thereof. In some embodiments, navigation pane 304 comprises a plurality of controls allowing attendees to navigate to various portions of the web-based video platform. When attendees navigate away from the video stream, the video stream may be resized and displayed in a corner or other area of user interface 300 such that the attendee can still view the video stream. In some embodiments, chat pane 306 comprises chat messages transmitted by the various attendees of the view stream. Chat pane 306 may also comprise chat header 310 allowing users to toggle between various chat areas, such as general chat, polls, and people, as illustrated. In some embodiments, user interface 300 comprises time left icon 312 indicative of the amount of time left for the event.

Also illustrated in user interface 300 are video control 314, audio control 316, screen share 318, and settings 320. Video control 314 may be actuated by an attendee to toggle video streaming on and off. Audio control 316 may be actuated by the attendee to toggle audio transmission on and off. Screen share 318 may be selected to allow the attendee to share a file, such as a text document or video. In some embodiments, video control 314, audio control 316, screen share 318, or a combination thereof are locked based on authorizations defined for the attendee. For example, only presenters may be able to speak, display video, or screen share, while attendees of the event may only view what is displayed in video pane 302. Settings 320 may allow the user to toggle various settings, such as target video and audio qualities. For example, the user may set a target video resolution of 1080p.

Also present in user interface 300, in some embodiments, is video quality slider 322. Video quality slider 322 may allow for the attendee to choose a video quality setting. Sliding video quality slider 322 towards the low end may display a video having a substantially low frame rate and/or a substantially low resolution. Attendees may choose a low video quality setting to save battery. Adjusting video quality slider 322 to the high end of video quality slider 322 may display a video at a substantially high resolution and/or a substantially high frame rate. In some embodiments, attendees can configure the low- and high-quality parameters for video quality slider 322 using settings 320. For example, the user may set the low quality to display the combined video stream at 480p resolution and 24 fps and the high quality to display the combined video stream at 4k and 60 fps.

In some embodiments, video pane 302 displays the video stream for the virtual event. As described above, multiple presenters may stream their own video streams (referred to hereinafter as presenter video streams) which are then forwarded from media services 206 and displayed to the other presenters as part of the video stream (referred to interchangeably hereinafter as the combined video stream). In some embodiments, the presenter video streams are individually forwarded from media services 206 to the other presenters as described above. The video stream may be for a work meeting, a conference, a convention (e.g., political convention, Comic-Con, etc.), or any other type of event. The event may be a hybrid event such that there is a mixture of attendees attending in-person and attending online. In some embodiments, the combined video stream includes live video, recorded video, or a mix of live video and recorded video. The combined video stream may stream shared documents or files, such as presentations, other video files, text documents, spreadsheets, PDFs, and the like. In some embodiments, video pane 302 comprises attendee count 324 indicating the current number of attendees. As described above, the combined video stream may be streamed to tens, hundreds, thousands, tens of thousands, or more attendees in real time.

In some embodiments, presenters in video pane 302 are arranged in various layouts according to predefined templates and/or a presenter hierarchy. For example, as illustrated in FIG. 3, first presenter 326 is the main presenter for the event, at the top of the presenter hierarchy, and comprises about half of video pane 302. Second presenter 328, third presenter 330, and fourth presenter 332 are presenters on a lower level of the hierarchy than first presenter 326. Presenters below the main presenter may be referred to as panelists of the combined video stream. Fifth presenter 334 and sixth presenter 336 are also illustrated in video pane 302 and may be considered at the lowest presenter hierarchy. As will be discussed in further detail below, the presenter hierarchy for an event may change dynamically based on various factors, such as which presenter is currently speaking.

Various other templates of video pane 302 may be used for embodiments described herein. In some embodiments, virtual event organizers and/or virtual event hosting system administrators may define various templates for the arrangement of video streams within video pane 302 for the specific event. For example, a second template may comprise first presenter 326, second presenter 328, third presenter 330, fourth presenter 332, fifth presenter 334, and sixth presenter 336 having equally sized video frames within video pane 302. Thus, each of the presenters may be considered to be on the same level of the hierarchy. In some embodiments, events may have at least one designated presenter at the top of the presenter hierarchy such that there is a default presenter when none of the presenters are speaking or screen sharing. In some embodiments, the hierarchy level defines actions a presenter can and cannot take, such as the ability to screen share a file, or to promote attendees to presenters.

As another example layout, a hybrid event template may comprise an in-person video stream taking up the top half of video pane 302 while other presenters participating online may have their video streams taking up a smaller amount of space in video pane 302. As described above, layouts may change throughout an event. Layout changes may represent a change of state that results in an adjustment to presenters' video streams, as will be discussed further below. For example, when a presenter begins to screen share a document, the video frame for the document may be resized to take up a majority of video pane 302, while the presenter's video frame may be shrunk and moved to an unobtrusive portion of video pane 302. In some embodiments, the presenter video frames are overlain on the screenshared document, and the screenshared document may be the entirety of video pane 302. In such an embodiment, each of the presenter video streams may be reduced to a "talking head" stream such that the presenter video streams are cropped to display only the head of the presenter, similar to the video frame illustrated with respect to fifth presenter 334. Switching to the talking head view may allow for encoding the presenter video streams at a lower resolution, bitrate, or frame rate, without suffering a loss of overall quality for the combined video stream because of the reduced size of the presenter video streams.

To increase the video stream quality for attendees, various adjustments may be made to the video stream. FIG. 3 illustrates various example cases which may lead to an adjustment to one or more video display parameters. In some embodiments, the size of the video frame for a presenter is adjusted throughout the duration of the video stream as described above. Based on the video frame size for a presenter video stream, various adjustments may be made to the presenter video stream. For example, a currently speaking presenter may have their video stream enlarged to take up a substantial portion of video pane 302, such as 50%. Other non-speaking presenters may have their video frames shrunk when they are not speaking or on mute. As video frame sizes are adjusted, the quality of the presenter video stream associated with each video frame may also be adjusted. Larger video frames may be encoded at a higher quality, while smaller video frames may be encoded at a lower quality to save bandwidth. In some embodiments, video streams in a smaller video frame may be forwarded from media services 206 at a lower frame rate than the frame rate uploaded to media services 206. In some embodiments, attendees may be able to reposition and resize the video frames of presenters to customize the combined video stream. In some embodiments, video frame sizes are adjusted in response to a poor connection from a presenter. For example, in response to detecting that fifth presenter 334 is uploading video at a substantially poor quality, the video frame for fifth presenter 334 may be shrunk to minimize the effect the poor video quality from fifth presenter 334 has on the overall quality of the combined video stream.

In some embodiments, the video stream quality is adjusted at media services 206 before being sent out to the attendees. In some embodiments, the video stream quality is adjusted at client device 202. For example, a presenter may be transmitting video at 720p to media services 206 and receiving video of the video stream at 1080p. When it is detected that the presenter reaches a low battery threshold on their client device 202, either or both of the transmitted video quality from the presenter may be decreased and the video stream quality received by the presenter for display by client device 202 may be decreased. For example, the transmitted video resolution of the presenter may drop from streaming at 720p to streaming at 480p, while the video stream resolution presented in user interface 300 to the presenter may also drop from 1080p to 720p. As such, the presenter may view the video stream at a lower quality, while other attendees may only notice a drop in quality from the individual stream from the presenter. Detection of poor network connection may also result in a video frame being shrunk, as illustrated with respect to fifth presenter 334, or the video being cropped or encoded at a reduced bitrate or result in turning off the presenter video stream entirely and placing the presenter into audio-only mode, as illustrated with respect to sixth presenter 336. As will be discussed in further detail below, various video super-resolution techniques may be employed at the media services 206 on the lower quality video streamed from the presenter to increase the video quality for other attendees. For example, the video may be scaled back up to 720p from the downscaled 480p.

Another video display parameter that may be adjusted to improve the video quality is illustrated with respect to second presenter 328. As shown, second presenter 328 is currently speaking. When a speaker is detected, the video quality for the speaker may be increased while the speaker is speaking. The video quality may be increased at media services 206 and/or at client device 202. For example, a video super-resolution algorithm may be applied to the video stream for second presenter 328. Alternatively, or additionally, media services 206 may request client device 202 to encode the presenter video stream for the speaker at a higher quality. In some embodiments, speakers may be detected using various machine learning algorithms that analyze received audio, along with motion associated with the speaker, such as the lips, face, shoulders, hands, or any combination thereof. In some embodiments, the frame rate, bitrate, and/or the resolution for second presenter 328 may be increased upon detection of second presenter 328 speaking. In some embodiments, the codec for second presenter 328 is changed to a higher quality codec, such as from H.263 to H.264.

Another example video display parameter that may be adjusted is illustrated with respect to third presenter 330 in which the video frame for third presenter 330 has been cropped such that the shoulders and the head of third presenter 330 takes up the majority of the video frame. In some embodiments, the video frame may be cropped to remove extraneous background information that requires extra bandwidth to encode. Cropping the video frame for third presenter 330 may be done in response to a drop in video quality transmitted from third presenter 330, such as detection of packet loss. Additionally, or alternatively, the video frame may be cropped when the background of the video frame reaches a predefined bitrate to encode. For example, if the background for third presenter 330 becomes more dynamic, such as if people begin moving in the background, the video frame may be cropped to reduce the amount of information that needs to be encoded. Alternatively, or additionally, a Gaussian blur may be applied to the background to reduce the bandwidth required to stream the presenter video stream for third presenter 330.

Looking now at fourth presenter 332, yet another example of a dynamically adjusted video display parameter is illustrated. Fourth presenter 332 is shown as gesticulating while talking and, therefore, presents a more dynamic video stream than other presenters that may make only small movements with their heads when speaking. It may be possible to display relatively static presenter video streams at a lower quality, such as at a lower resolution or frame rate, without attendees noticing the lower quality video because of the lack of motion within the videos. However, when the presenter video stream becomes more dynamic, streaming the presenter video stream within the video stream at the lower quality may introduce noticeable artifacts to attendees. As is known to those skilled in the art, video codecs commonly operate by predicting the differences between frames, using interframe prediction. When consecutive video frames are largely the same, less bandwidth may be required to stream the video because subsequent video frames can be easily approximated from previous video frames. However, when consecutive video frames have large differences, such as fourth presenter 332 waving their hands, making interframe predictions that assume that the next frame will be largely the same as the previous frame may result in various artifacts present in the video stream. Similar difficulties may be encountered for codecs making intraframe predictions. As such, substantially dynamic video streams may be encoded at a higher frame rate, bitrate, and/or resolution, or with a different codec altogether.

Looking now at first presenter 326, a screen shared presentation is displayed. As described above, presenters may have the option to share files that are displayed in the combined video stream. When sharing a file, the presenter video stream for the sharing presenter may be shrunk, hidden, and/or moved within video pane 302. Video streams that are streaming a file may be encoded differently than video streams displaying a person. Shared files are often static (or substantially static), and, as such, may be encoded at a lower frame rate and/or resolution to save bandwidth. In some embodiments, bandwidth may be saved by sharing only semantic data associated with the file, thus reducing the amount of video data to be shared. Often, when streaming a screen shared document, the number of bits required to stream the document is larger than the document itself. In some embodiments, user interface 300 also comprises, or is associated, with a document viewer. In some embodiments, the document viewer allows the presenter and attendees to each have the document available on their respective client devices 202, without the presenter streaming the document via the video stream. When the presenter changes the state of a document (e.g., changing a slide in a presentation), the media services 206 may transmit a signal indicative of that change to each of client devices 202 and client devices 202 may reflect the change within the attendees' document.

Figure 4:
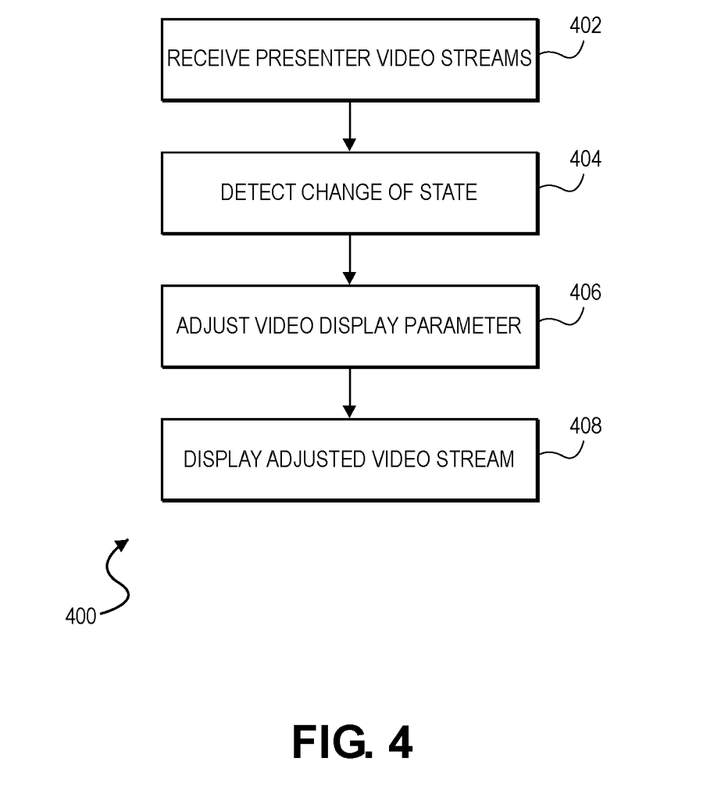
FIG. 4 illustrates an exemplary method for adaptive video display for certain embodiments.

FIG. 4 illustrates an exemplary method 400 for adaptive video quality for certain embodiments. At step 402, presenter video streams may be received at media services 206. Presenter video streams may be streamed from client devices 202, such as via a webcam on a computer, or via a camera on a mobile phone or other mobile device. The presenter video streams may then be encoded and transmitted to media services 206. Once received at media services 206, the presenter video streams may be transmitted with other presenter video streams as part of the video stream for the virtual event. In some embodiments, the presenter video streams are forwarded individually from media services 206 to the attendees. In some embodiments, the presenter video streams are mixed and sent from media services 206 as part of combined video stream.

Various encoding, decoding, and transcoding techniques may be used in embodiments described herein. In some embodiments, encoding is done using variable bitrate, constant bitrate, adaptive bitrate techniques, or a combination thereof. Adaptive bitrate protocols, such as HTTP Live Streaming (HLS), Dynamic Adaptive Streaming over HTTP (DASH), Smooth Streaming, Uplynk, or any combination thereof may be used to create multiple bitrate streams for the video stream. The video client on an attendee client device 202 may then analyze the attendee's network throughput, CPU usage, and other similar parameters to adaptively stream the video at the optimal bitrate for the attendee. In some embodiments, the adaptive bitrate algorithms may be self-learning and trained using various neural networks. Self-learning algorithms may be employed on at least one of the media services 206 or client devices 202. In some embodiments, the bitrates for the video stream may be about 1,000 kbps to about 55,000 kbps or more. The video bitrate may vary according to the resolution and the frame rate, as is known to those skilled in the art. For example, providing a 720p video at 30 frames per second may require a bitrate near 1,000 kbps while providing a 4k video at 60 frames per second may require a bitrate nearer to 50,000 kbps.

Various video codecs may be utilized in embodiments herein and may be changed dynamically in response to changing states associated with the presenter video stream and/or the video stream. Example video codecs include, but are not limited to, AV1, H.263, H.264, H.265, H.266, MP4V-ES, MPEG-1, MPEG-2, Theora, VP8, VP9, or any combination thereof. In some embodiments, media services 206 utilizes encoder-agnostic techniques to encode the data in various formats.

Audio codecs or codec parameters may also be changed on the fly. Presenters having a poor connection to media services 206 may switch to a more lossy codec that requires less bandwidth to stream. Any commonly used audio codec may be used in embodiments described herein such as, MP3, Advanced Audio Coding (AAC), Dolby Digital AC-3, Dolby Digital EC-3, AIFF, FLAC, Opus, G.711 PCM (A-law or μ-law), G.722 or any combination thereof. Audio bitrates may also be varied based on the video stream quality; in some embodiments, the audio bitrate is one of about 64 kbps, about 128 about kbps, about 256 kbps, about 320 kbps, or about 64 kbps to about 320 kbps.

Additionally, various machine learning algorithms and techniques may be employed in embodiments herein to adjust the quality of the video stream. Video super-resolution techniques may be used to increase the video quality by filling in details within macroblocks generated in an initial encoding of the video. Similarly, audio super-resolution algorithms may be applied to increase audio quality of a received video stream. In some embodiments, audio super-resolution algorithms are applied to recorded events for subsequent playback and may not be applied during the event. Other audio enhancement techniques, such as background noise suppression, noise gating, and discontinuous audio transmission, may also be used with embodiments described herein to increase the overall video quality.

As described above, the video quality of the video stream may be adjusted without making any adjustments to the encoding of the presenter video streams, and media services 206 may forward presenter video streams to the attendees at various frame rates and resolutions. In some embodiments, presenters upload their video to media services 206 at various resolutions and/or frame rate, and media services 206 then selects an appropriate resolution and/or frame rate to forward the presenter video stream to an attendee based on computing systems states for the attendee. For example, a presenter may upload their video at 480p, 720p, and 1080p, and at 60 fps for each resolution to media services 206. For an attendee with a strong Internet connection, media services 206 may forward the 1080p stream, while an attendee with a poor Internet connection may receive the 480p stream from media services 206. Additionally, media services 206 may filter frames from the 480p/60 fps stream to lower the frame rate to 24 fps for the attendee with poor Internet connection.

At step 404, a change of state associated with the video stream may be detected. In some embodiments, the change of state is detected for at least one of a presenter video stream or the combined video stream. Once the change of state is detected, a video display parameter may be adjusted at step 406. For clarity of description, step 404 and step 406 will be discussed together, with various state changes and video display parameter adjustments to the state changes described below.

As described above, the change of state may take various forms. Broadly, changes of state may comprise changes related to changes in user interface 300 of the video stream (e.g., changes in the mode of the video stream), changes associated with the video quality of the presenter video streams, and systems-level changes associated with client devices 202. The mode of the video stream may comprise the layout for video pane 302 and/or the presenter hierarchy for the event. In some embodiments, changes of state may also be associated with media services 206, such as an excess server load.

Broadly, to improve the video quality of the video stream, one or more video display parameters may be adjusted. The video display parameters may comprise, for example, adjusting at least one of the frame rate, the bitrate, or the resolution of the presenter video stream and/or the video stream. In some embodiments, adjusting the video display parameters involves media services 206 selecting and/or filtering a presenter video stream with the appropriate video display parameters to send to an attendee. Media services 206 filtering the presenter video stream may be done in response to a detected change at client device 202 for an attendee. As described above, the one or more video display parameters may be adjusted such that information within the video that is considered to be important is prioritized over information that is considered to be less important. Generally, moving parts, such as a head of the presenter while speaking, may be considered to be more important than substantially static portions of the video, such as the background or the shoulders of the presenter. Additionally, a currently speaking presenter may be considered more important than presenters who are not speaking. The determined-to-be-important regions of the video may be encoded at a higher quality than the non-important regions to provide an optimal viewing experience to a presenter. Presenters higher on the presenter hierarchy may also be considered more important than presenters lower on the presenter hierarchy.

Systems-level parameters associated with client devices 202 may also result in video display parameters being adjusted. Various system level parameters such as CPU usage, battery level, upload/download speed, packet loss, jittering, and other connection-related parameters may result in video display parameters being adjusted. In some embodiments, systems-level parameters associated with client devices 202 may result in an overriding of the video quality set at video quality slider 322. As an example, if the bandwidth available for the presenter to stream their presenter video stream drops below a predefined threshold, the resolution for the presenter video stream may change from being streamed at 1080p to 720p. Alternatively, or additionally, media services 206 may filter the frame rate for the presenter video stream from 60 fps to 30 fps before transmitting the presenter video stream. Video display parameter adjustments based on changes of state associated with client devices 202 may be made solely at client devices 202 with no effect on media services 206. In some embodiments, the presenter video stream is adjusted both at a client device 202 and at media services 206, with a lower quality video sent from client device 202 in response to a change associated with client device 202 and an adjustment of the lower quality video made at media services 206 to increase the video quality before forwarding the presenter video stream to the presenters.

In some embodiments, client device 202 sends systems-level information to media services 206, and media services 206 requests client device 202 to adjust the presenter video stream in turn. For example, if it is detected that the presenter's internet upload speed drops below a predefined threshold, media services 206 may request client device 202 to encode the presenter video stream for the presenter at a lower quality to reduce the likelihood that the presenter video stream lags. Alternatively, if the presenter is demoted within the presenter hierarchy, their client device 202 can upload video at a lower resolution. Similarly, if the download speed drops, client device 202 may select a lower bitrate, resolution, or frame rate from the various streams provided by media services 206 to prevent lag on client device 202. As illustrated with respect to third presenter 330, when presenters transmit low quality video to media services 206, video frames may be cropped to include only information determined to be important to the video stream, such as the face of third presenter 330 prior to transmission. Various facial detection and facial tracking techniques may be used to track the face of presenters in their presenter video streams. When cropping videos, media services 206 may attempt to replace the cropped information such that the cropped video looks substantially similar to other videos in video pane 302. For example, media services 206 may retrieve a background from database 210 to display with the cropped video. Similarly, various machine learning techniques may be utilized to fill in the cropped portion of the video. For example, the shoulders of the cropped presenter may be generated using a machine learning algorithm, such as a deepfake algorithm, and presented as part of the video stream. As another example, video super-resolution techniques may be applied to the lower resolution video to upscale the video to be consistent with the resolution of the other videos in the video stream. The video super-resolution may also work to eliminate any artifacts present due to the poor video quality. In some embodiments, deblocking filters may be applied to presenter video streams to improve the video quality and smooth edges formed by macroblocks. In some embodiments, media services 206 and/or client device 202 ends video transmission entirely from a presenter in response to a poor detection, low battery, or the like, so as to maintain an audio connection. Similar techniques may also be used when client devices 202 are interacting with the video stream over a mobile network and have an inadequate signal for streaming the video stream.

Adjusted video quality parameters for a presenter may lead to changes made at media services 206 for the video stream. It may be desirable for media services 206 to display each of the presenter video streams at substantially the same quality to provide a smooth experience for attendees. Alternatively, media services 206 may adjust the video stream such that each video frame of substantially the same size displays a video stream at substantially the same quality. For example, smaller video frames such as those for fifth presenter 334 and sixth presenter 336 may be streamed at 480p while the stream for first presenter 326 may be streamed at 1080p. Because of the smaller video frame size of fifth presenter 334 and sixth presenter 336 as compared to first presenter 326, it may be difficult for an attendee watching the video to notice the lower resolution. As such, bandwidth may be saved without hurting the attendee experience. However, a lower quality presenter video stream in a substantially large video frame (e.g., the video frame for first presenter 326 or second presenter 328) may be noticed by attendees and lead to a worse event experience for attendees. For example, if media services 206 outputs the video stream at 4k, and the input resolution for third presenter drops to 240*p*, media services 206 may apply various video super-resolution or other machine learning techniques to boost the quality of the presenter video stream for third presenter 330 such that it is consistent with the other presenter video streams in the video stream. Similar adjustments may be made when the frame rate for a presenter video stream is lowered in response to a change of state.

Along with parameters for client devices 202, server parameters, such as server load, may also indicate a change of state that results in tasks being offloaded to client devices, edge servers, third party servers, or a combination thereof as described above. The server parameters may also result in adjustments made to the encoding of the video stream distributed from the server to the various client devices. For example, rather than offloading tasks from media services 206, media services 206 may simply encode the video stream at lower resolutions, bitrates, and/or frame rates based on server load.

As another example, the lack of audio in a video stream may represent a change of state. When the amount of audio data drops below a predefined value, bandwidth may be saved by not transmitting data during substantially inactive audio periods. Various speech detection algorithms may be utilized to detect when speakers change and when none of the presenters are currently speaking. When a speech detection algorithm detects a presenter is no longer speaking, client device 202 may stop transmitting audio data for the presenter without the presenter needing to activate a mute function. Similar changes may also be made at media services 206 which may request client devices 202 to end audio transmission when no speech is detected. In some embodiments, media services 206 detects a substantially low amount of audio data from client devices 202 and filters the low amount of audio data out from the video stream. Changes in the layout of video pane 302 may also influence the discontinuous audio transmission for presenters. Presenters who are demoted within the presentation hierarchy may automatically have their audio data transmission ended. As another example, events in the virtual event hosting platform may follow a scheduled presentation lineup. As such, when the time to speak for a presenter ends, the presenter may be muted automatically and audio transmission stopped.

As described above with respect to second presenter 328, speaker detection, and, more specifically, the change from one speaker to a second speaker, may represent a change of state. When a presenter is speaking, attendees may be more focused on the speaking presenter than the non-speaking presenters; as such, encoding the video for the speaking presenter at a higher quality may improve the attendee experience.

Additionally, artifacts may be more likely to appear when presenters are speaking due to the motion of the face when speaking if the presenters are not encoded at a sufficient quality. Upon detecting a new speaker, the new speaker's video may be adjusted to display at a higher frame rate and/or resolution. The adjustment may involve encoding the presenter video stream at client device 202 at a higher quality or receiving the presenter video stream at media services 206 and applying a video super-resolution (such as applying deepfake video augmentation techniques until the client device 202 can catch up) to the received presenter video stream. Background noise suppression may also be applied to the presenter video stream for a currently speaking presenter. In some embodiments, the video frame for the speaker is dynamically encoded such that portions of the video are encoded at a higher quality than others. For example, the face of the speaker may be encoded at a higher frame rate than the background. In some embodiments, the dynamic encoding of regions within the video frame is performed for both non-speaking and speaking presenters in the video stream.

When a change in speaker is detected, the new speaker may be promoted within the presenter hierarchy. For example, if fifth presenter 334 begins speaking, fifth presenter 334 may swap places with second presenter 328 within video pane 302. In some embodiments, a newly detected speaker is automatically moved to the top of the presenter hierarchy and may be given the largest video frame size. In some embodiments, presenters are locked into their video frame position throughout the event and cannot be moved even if they stop transmitting audio and/or data. For example, first presenter 326 may be an event organizer and may be locked into the video frame position shown with respect to video pane 302. As such, the position of first presenter 326 may remain static throughout the web-based event, while the rest of the presenters may have their positions adjusted throughout the event based on speaker detection, audio transmission, video quality, and the like as described herein.

When it is detected that a speaker stops speaking, adjustments may be made to the video quality of the speaker's presenter video stream to save bandwidth. As described above, the video stream may be for a conference, presentation, convention, or the like where multiple presenters may be present in the video stream at once, but only one or a subset of presenters may be speaking at any given time. Consequently, it may be advantageous to encode the videos of non-speakers at a lower quality than those of speakers. Alternatively, or additionally, media services 206 may filter a non-speaker's video stream and forward the video stream at a lower frame rate than it was received. Speaker detection make be performed based on participant audio levels. Alternatively, in some embodiments, video-based speaker detection may be done using various active speaker detection algorithms that detect movement in the lips, head, upper body, hands, or any combination thereof. The speaker detection algorithms may work temporally and/or spatially. Speaker detection may be done using various machine learning techniques and neural network architectures such as recurrent neural networks (RNNs), convolutional neural networks (CNNs), long short-term memory networks, generative adversarial neural networks (GANs), time delayed neural networks (TDNNs), or a combination thereof. When a speaker is identified, the codec for that speaker's video stream may be changed to a higher quality codec. In some embodiments, speaker detection is performed at media services 206.

Similarly, motion detection within a video stream may represent a change of state that causes a video display parameter adjustment, such as fourth presenter 332 gesticulating while speaking, or first presenter 326 screen sharing a substantially dynamic video. Presenters who are gesticulating in their video may have their video encoded at a higher frame rate, resolution, or bitrate to increase the video quality. When a presenter shifts from a static to a more dynamic video stream, the use of a lower quality codec may result in various temporal artifacts, such as jerkiness, within the presenter video stream. As such, switching the codec from a lower quality codec to a higher quality codec to handle the dynamism in the video may result in an improved video quality for presenters. For example, the codec may be switched from H.264 to H.265. Various motion detection algorithms may be employed to detect the motion of the presenter in the video. In some embodiments, a threshold time of motion may be required to be reached before the codec is switched to avoid changings codecs too frequently. Alternatively, or additionally, client device 202 may encode the presenter video stream at a higher frame rate and/or media services 206 may upscale the presenter video stream before sending the presenter video stream to the attendees.

As described above and illustrated with respect to third presenter 330, in some embodiments, a video frame may be cropped to reduce bandwidth. Typically, the background of a video stream will comprise a relatively static image (e.g., a bookcase, a wall etc.) that does not take excess bandwidth or processing power to encode. However, cropping the video frame to reduce the amount of background present in the video may still save an appreciable amount of bandwidth in some circumstances, particularly where the background is dynamic. Additionally, backgrounds typically do not contain pertinent information for attendees and, as such, may be removed or cropped without the loss of important information to an attendee. In some embodiments, the video frame is cropped such that the face of the presenter comprises at least 50% of the video frame, at least 60% of the video frame, at least 70% of the video frame, at least 80% of the video frame, or at least 90% of the video frame. In some embodiments, video frames are cropped at client devices 202 before the presenter video stream is sent to media services 206. In some embodiments, media services 206 crops the presenter video stream before routing and forwarding the presenter video stream as part of the combined video stream. Portions of the video frame that are cropped from the presenter video stream may be replaced at media services 206 using various machine learning techniques, such as deepfakes. For example, if third presenter 330 is cropped above the shoulders, shoulders may be generated and added to the cropped presenter video streams. Similarly, background information may be added to the cropped presenter video stream.

In some embodiments, determining when a background should be cropped may be based in part on the dynamism of the background. For example, a presenter streaming video while at a coffee shop may have a more dynamic background due to customers moving in and out of frame as compared to a presenter streaming video from a home office. As such, media services 206 and/or client device 202 may choose to crop the video frame for the presenter at the coffee shop but not the video frame of the presenter at the home office may not be. Broadly, if it is detected that the amount of bandwidth required to encode the background of the video from a presenter reaches a threshold value, the video frame may be cropped. As another example, alternatively or additionally to cropping the video frame, the background of the video frame may be frozen or switched to a static background (e.g., a solid color, such as red) such that substantially no bandwidth is required to encode the background. In some embodiments, the static background color is selected to not clash with a detected color of the presenter's outfit. Similarly, a Gaussian blur may be applied to the background to save bits on encoding the presenter video stream, or to disguise the fact that it is being encoded at a lower bitrate or has been replaced by a static image.

As mentioned previously, various audio and/or video super-resolution techniques may be used to increase the video quality for users. Video super-resolution may be used to increase the apparent resolution of a video by upscaling frames in the video. Video super-resolution may be carried out using various machine learning algorithms or neural networks, such as CNNs or GANs. In some embodiments, a plurality of video super-resolution techniques is employed for increasing the video quality in the video stream. Video super-resolution may be performed on at least one of media services 206 or client devices 202. The employed video super-resolution technique may be changed dynamically when there is a change in the presenter video stream and/or the video stream. For example, when the number of presenter video streams increases above a predefined value, it may be advantageous to switch video super-resolution models to a model that can better handle the increase in presenter video streams. Similarly, the video super-resolution technique may be adjusted when the type of video being shared changes. For example, if the video stream shifts from a video stream comprising multiple presenter video streams to a video stream in which a document (e.g., presentation, pre-recorded video, text editing document, spreadsheet, etc.) is being shared, the video super-resolution technique may adjust to a technique more suited to upscaling screen shared documents. Likewise, when the video stream shifts to a less resource-intensive stream, the video super-resolution model may also adjust to a model that is not as resource-intensive.

In some embodiments, the virtual event hosting platform utilizes traditional video super-resolution techniques, including analysis of the frequency and/or the spatial domain, along with techniques based on deep learning models. In some embodiments, media services 206 may offload video super-resolution to client devices 202 to reduce server bandwidth. In some such embodiments, the lower-resolution video together with machine-learning parameters may be transmitted to the media services 206. In some embodiments, video super-resolution may be disabled at media services 206 in an effort to save bandwidth. Similarly, when a low battery, excess CPU usage, overheating, or the like, is detected at client device 202, video super-resolution may be temporarily disabled at client device 202.

Along with video super-resolution, audio super-resolution techniques may be used herein to improve the quality of the video stream. In some embodiments, background noise suppression techniques may be employed that use trained neural networks to reduce background noise. Video streams of the event may be saved and recorded for viewing after the stream has ended. In some embodiments, super-resolution techniques for both audio and video may be applied to recorded streams to improve the playback quality.

In some embodiments, the change of state is a change in the number of attendees of the video stream. As the number of attendees increases, the necessary bandwidth to handle the data at the media services 206 may also increase. When a threshold number of attendees is detected, it may be necessary to degrade certain portions of the video stream to handle the increased bandwidth. Media services 206 may begin offloading various tasks to edge servers, third party servers, or client device 202 as threshold attendee levels are reached. For example, clients may be offloaded to a CDN at the expense of increased latency. In some embodiments, media services 206 will forgo encoding the video stream at a high video quality when the number of viewers reaches a threshold number. The threshold number of attendees may be 10, 100, 1,000, 10,000, 100,000 or any number of attendees. In some embodiments, a change in the number of presenters may result in the codec used for the video stream. In some embodiments, the attendee threshold number for adjusting video quality is configurable by the user, event organizers, or virtual event hosting system administrators. As the number of attendees decreases, the video stream may be upgraded to provide an improved video quality.

Similarly, a change in the number of presenters in the web-based event may represent a change of state. As the number of presenters changes, the video frame size for each of the presenters may be shrunk. In some embodiments, some presenters are only allowed to present in audio-only mode and may not have video displayed. In some embodiments, presenter video streams are dynamically enabled and disabled upon speaker detection.

Finally, at step 408, the adjusted video may be displayed to the client. Either or both of the presenter video stream or the combined video stream may be adjusted. In some embodiments, the adjusted video stream is adjusted at media services 206 and then transmitted to client device 202 for display. In some embodiments, the video stream is adjusted at client device 202 and displayed at client device 202 with no adjustments made at media services 206. In some embodiments, the video stream is adjusted both at media services 206 and further at client device 202 before being displayed to the attendee.

While embodiments have been described with respect to detecting a single change of state and adjusting a video display parameter thereafter, it is contemplated that multiple state changes and/or thresholds must be reached in order for a video display parameter to be adjusted. For example, the presence of greater than 10,000 attendees of the video stream and greater than 10 presenter video streams in the combined video stream may be required before media services 206 transmits the overall video at a lower quality.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

The invention claimed is:

1. A system for adaptively adjusting video quality in a virtual event hosted by a virtual event hosting platform, the system comprising:
 a video server;
 at least one processor; and
 one or more non-transitory computer-readable media storing computer-executable instructions that when executed by the at least one processor, perform a method of adaptively adjusting the video quality in the virtual event hosted by the virtual event hosting platform, the method comprising:
  receiving, at the video server, a plurality of presenter video streams associated with a plurality of presenter computing devices of a plurality of presenters, the plurality of presenter video streams forming the virtual event, wherein each presenter computing device is associated with a presenter video stream of the plurality of presenter video streams;

forwarding the plurality of presenter video streams to each of the plurality of presenter computing devices, the plurality of presenter video streams displayed according to a predefined video stream layout;

monitoring, by the video server, an audio activity level of the presenter video stream and a plurality of device states for the plurality of presenter computing devices, wherein the plurality of device states comprises a bandwidth availability, a processing load, and a battery level;

detecting, by the video server, a first change of at least one device state of the plurality of device states, the first change of the at least one device state associated with a presenter computing device of the plurality of presenter computing devices;

in response to detecting the first change of the at least one device state, automatically generating a request, by the video server, for the presenter computing device to apply a video super-resolution technique to the presenter video stream, wherein the video super-resolution technique is selected based at least in part on a number of presenter video streams for the virtual event;

responsive to a second detection that the audio activity level is below a predetermined threshold, suppressing at least a portion of audio data associated with the presenter video stream based on the audio activity level;

receiving, at the video server, an updated presenter video stream from the presenter computing device associated with the presenter video stream;

forwarding, from the video server, the updated presenter video stream to each presenter computing device according to the predefined video stream layout; and responsive to a third detection of a second change of the at least one device state of the presenter computing device, automatically generating a second request, by the video server, for the presenter computing device to disable the video super-resolution technique.

2. The system of claim 1, wherein the predefined video stream layout is associated with a presenter hierarchy.

3. The system of claim 2, wherein the presenter hierarchy defines at least one of a video frame position in the predefined video stream layout or a presenter authorization level for the virtual event.

4. The system of claim 2, wherein the method further comprises:

detecting a speaker from the plurality of presenter video streams; and in response to detecting the speaker, promoting the speaker within the presenter hierarchy.

5. The system of claim 1, wherein the method further comprises:

mixing, at the video server, the plurality of presenter video streams into a combined video stream for the virtual event; and forwarding, from the video server, the combined video stream to a plurality of attendee computing devices associated with a plurality of attendees of the virtual event.

6. The system of claim 5, wherein the method further comprises forwarding, from the video server, the updated presenter video stream as a part of the combined video stream to the plurality of attendee computing devices.

7. A computer-implemented method for adaptively adjusting video quality in a virtual event hosted by a virtual event hosting platform, the computer-implemented method comprising:

receiving a plurality of presenter video streams associated with a plurality of presenter computing devices of a plurality of presenters, the plurality of presenter video streams forming the virtual event, wherein each presenter computing device is associated with a presenter video stream of the plurality of presenter video streams;

forwarding the plurality of presenter video streams to each of the plurality of presenter computing devices, the plurality of presenter video streams displayed according to a predefined video stream layout;

monitoring an audio activity level of the presenter video stream and a plurality of device states for the plurality of presenter computing devices, wherein the plurality of device states comprises a bandwidth availability, a processing load, and a battery level;

detecting a first change of at least one device state of the plurality of device states, the first change of the at least one device state associated with a presenter computing device of the plurality of presenter computing devices;

in response to detecting the first change of the at least one device state, automatically generating a request for the presenter computing device to apply a video super-resolution technique to the presenter video stream, wherein the video super-resolution technique is selected based at least in part on a number of presenter video streams for the virtual event;

responsive to a second detection that the audio activity level is below a predetermined threshold, suppressing at least a portion of audio data associated with the presenter video stream based on the audio activity level;

receiving an updated presenter video stream from the presenter computing device associated with the presenter video stream;

forwarding the updated presenter video stream to each presenter computing device according to the predefined video stream layout; and responsive to a third detection of a second change of the at least one device state of the presenter computing device, automatically generating a second request for the presenter computing device to disable the video super-resolution technique.

8. The computer-implemented method of claim 7, wherein the predefined video stream layout is associated with a presenter hierarchy.

9. The computer-implemented method of claim 8, wherein the presenter hierarchy defines at least one of a video frame position in the predefined video stream layout or a presenter authorization level for the virtual event.

10. The computer-implemented method of claim 8, further comprising:

detecting a speaker from the plurality of presenter video streams; and in response to detecting the speaker, promoting the speaker within the presenter hierarchy.

11. The computer-implemented method of claim 7, further comprising:

mixing the plurality of presenter video streams into a combined video stream for the virtual event; and forwarding the combined video stream to a plurality of attendee computing devices associated with a plurality of attendees of the virtual event.

12. The computer-implemented method of claim 11, further comprising:
forwarding the updated presenter video stream as a part of the combined video stream to the plurality of attendee computing devices.

13. One or more non-transitory computer-readable media storing computer-executable instructions that, when executed by at least one processor of a virtual event hosting platform, cause the virtual event hosting platform to perform operations comprising:
receiving a plurality of presenter video streams associated with a plurality of presenter computing devices of a plurality of presenters, the plurality of presenter video streams forming a virtual event, wherein each presenter computing device is associated with a presenter video stream of the plurality of presenter video streams;
forwarding the plurality of presenter video streams to each of the plurality of presenter computing devices, the plurality of presenter video streams displayed according to a predefined video stream layout;
monitoring an audio activity level of the presenter video stream and a plurality of device states for the plurality of presenter computing devices, wherein the plurality of device states comprises a bandwidth availability, a processing load, and a battery level;
detecting a first change of at least one device state of the plurality of device states, the first change of the at least one device state associated with a presenter computing device of the plurality of presenter computing devices;
in response to detecting the first change of the at least one device state, automatically generating a request for the presenter computing device to apply a video super-resolution technique to the presenter video stream, wherein the video super-resolution technique is selected based at least in part on a number of presenter video streams for the virtual event;
responsive to a second detection that the audio activity level is below a predetermined threshold, suppressing at least a portion of audio data associated with the presenter video stream based on the audio activity level;
receiving an updated presenter video stream from the presenter computing device associated with the presenter video stream;
forwarding the updated presenter video stream to each presenter computing device according to the predefined video stream layout; and
responsive to a third detection of a second change of the at least one device state of the presenter computing device, automatically generating a second request for the presenter computing device to disable the video super-resolution technique.

14. The one or more non-transitory computer-readable media of claim 13, wherein the predefined video stream layout is associated with a presenter hierarchy.

15. The one or more non-transitory computer-readable media of claim 14, wherein the presenter hierarchy defines at least one of a video frame position in the predefined video stream layout or a presenter authorization level for the virtual event.

16. The one or more non-transitory computer-readable media of claim 14, wherein the computer-executable instructions further cause the virtual event hosting platform to perform operations comprising:
detecting a speaker from the plurality of presenter video streams; and
in response to detecting the speaker, promoting the speaker within the presenter hierarchy.

17. The one or more non-transitory computer-readable media of claim 13, wherein the computer-executable instructions further cause the virtual event hosting platform to perform operations comprising:
mixing the plurality of presenter video streams into a combined video stream for the virtual event; and
forwarding the combined video stream to a plurality of attendee computing devices associated with a plurality of attendees of the virtual event.

18. The one or more non-transitory computer-readable media of claim 17, wherein the computer-executable instructions further cause the virtual event hosting platform to perform operations comprising:
forwarding the updated presenter video stream as a part of the combined video stream to the plurality of attendee computing devices.

\* \* \* \* \*